Oct. 16, 1951   J. J. BAUER   2,571,407
PLANTER SUPPORTING IMPLEMENT
Filed May 28, 1949   3 Sheets-Sheet 2

INVENTOR
J. J. Bauer
BY
ATTORNEYS

Patented Oct. 16, 1951

2,571,407

UNITED STATES PATENT OFFICE 2,571,407

PLANTER SUPPORTING IMPLEMENT

Joseph J. Bauer, Tracy, Calif.

Application May 28, 1949, Serial No. 96,001

1 Claim. (Cl. 111—60)

This invention is directed to, and it is an object to provide, a novel implement adapted to support seed planting machines for movement along the ground in operative relation.

Another object of the invention is to provide a planter supporting implement which includes a novel frame structure in which the seed planting machines are mounted in draft relation and for adjustment between a lowered working position and a raised position for turning at the ends of rows or for transport from place to place; such adjustment being accomplished manually from an operator's platform at the rear of the implement.

A further object is to provide the implement with a leading plow assembly which digs irrigation furrows to the sides of each longitudinal seed bed, and a leveler blade assembly which levels each seed bed between said furrows in advance of the seeds being drilled into the ground by the corresponding planting machine.

A still further object of the invention is to provide an implement, as above, which makes possible continuous, even planting of vegetable seeds in drills wherein the seeds are deposited a predetermined and like depth below the smooth surface of the seed bed.

It is also an object of the invention to provide a planter supporting implement which is designed for ease and economy of manufacture; the implement being of relatively simple but rugged construction capable of withstanding long and continuous service in draft relation behind a tractor.

These objects are accomplished by means of such structure and relative arrangement of parts as will fully appear by a perusal of the following specification and claims.

Figure 1:
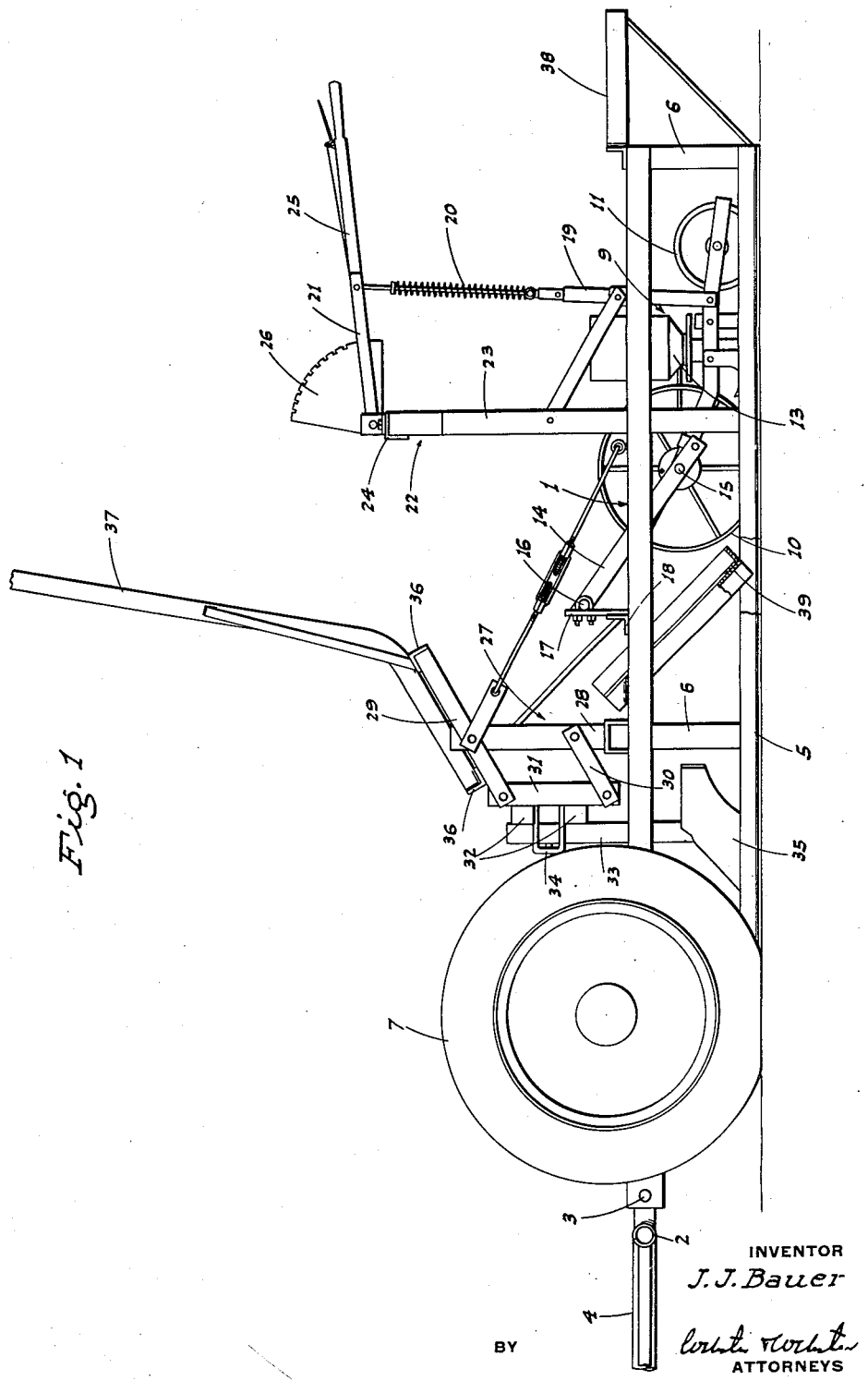
Fig. 1 is a side elevation of the implement with the plow assembly and planting machines in lowered, working position.

Referring now more particularly to the characters of reference on the drawings, the implement comprises a rectangular main frame, indicated generally at 1, which frame is of rigid open construction. At the front thereof the frame 1 includes a transverse hitch bar 2, pivotally connected, as at 3, for relative vertical swinging motion, and a tongue 4 projects forwardly from the hitch bar 2 centrally of its ends for connection in draft relation to a tractor.

The main frame 1 is disposed adjacent but above the ground, and is supported on opposite sides by longitudinal, sled-type runners 5 mounted in connection with the main frame by legs 6.

Additionally, the main frame is supported from the ground, adjacent the forward end of said frame, by a pair of transversely spaced pneumatic tire wheels 7 affixed to the main frame 1 by mounts 8. These wheels 7 provide additional stability to the implement, particularly at the forward end thereof.

The main frame 1 is transversely elongated, in the present embodiment, for the purpose of mounting a pair of seed planting machines, indicated generally at 9, in side by side relation with predetermined row spacing therebetween. In other words, the implement is here shown as adapted for carrying two seed planting machines 9 for working along adjacent rows.

As the mount and related apparatus for each seed planting machine 9 is identical, a description of one will suffice for both.

Each seed planting machine 9 is disposed in an open portion of the main frame 1 laterally of its center line and adjacent the rear end of said frame; each such machine including a front roller 10, a rear roller 11, and a seed drill assembly therebetween, indicated generally at 12. A seed hopper 13 feeds to the drill assembly 12. The machines 9 are conventional.

The draft structure for each planting machine 9 comprises a pair of transversely spaced, longitudinal draft arms 14 pivotally connected to the front axle or spindle of the planting machine, as at 15, and thence extending forwardly to pivotal connection with a horizontal cross shaft 16 clamped between transversely spaced brackets 17 which upstand from a cross member 18 of the main frame.

With this arrangement, the planting machine 9 is connected in draft relation to the main frame 1, but is capable of relative vertical floating motion; such machine being yieldably spring-pressed in a downward direction rearwardly of the draft arms 14, as follows:

Between the rear roller 11 and seed hopper 13, each planting machine 9 is fixed with an upstanding, inverted U-shaped yoke 19, and a compression spring unit 20 pivotally connects between said yoke 19 at the top and a corresponding swing frame 21 vertically swingably mounted thereabove on an upstanding transverse frame structure, indicated generally at 22, on the main frame; said frame structure 22 including posts 23 connected by a top cross member 24.

A hand lever 25 extends upwardly and rearwardly from one side of the swing frame 21, and releasable latch means, including a notched quadrant 26, normally secures the swing frame 21 and hand lever 25 in a selected position of vertical adjustment.

When the hand lever 25 is swung downward and latched in a lowered position, as in Fig. 1, the planting machine 9 is in ground engagement, and the compression spring unit 20 is under load; thus yieldably urging said machine in a downward direction.

Figure 2:
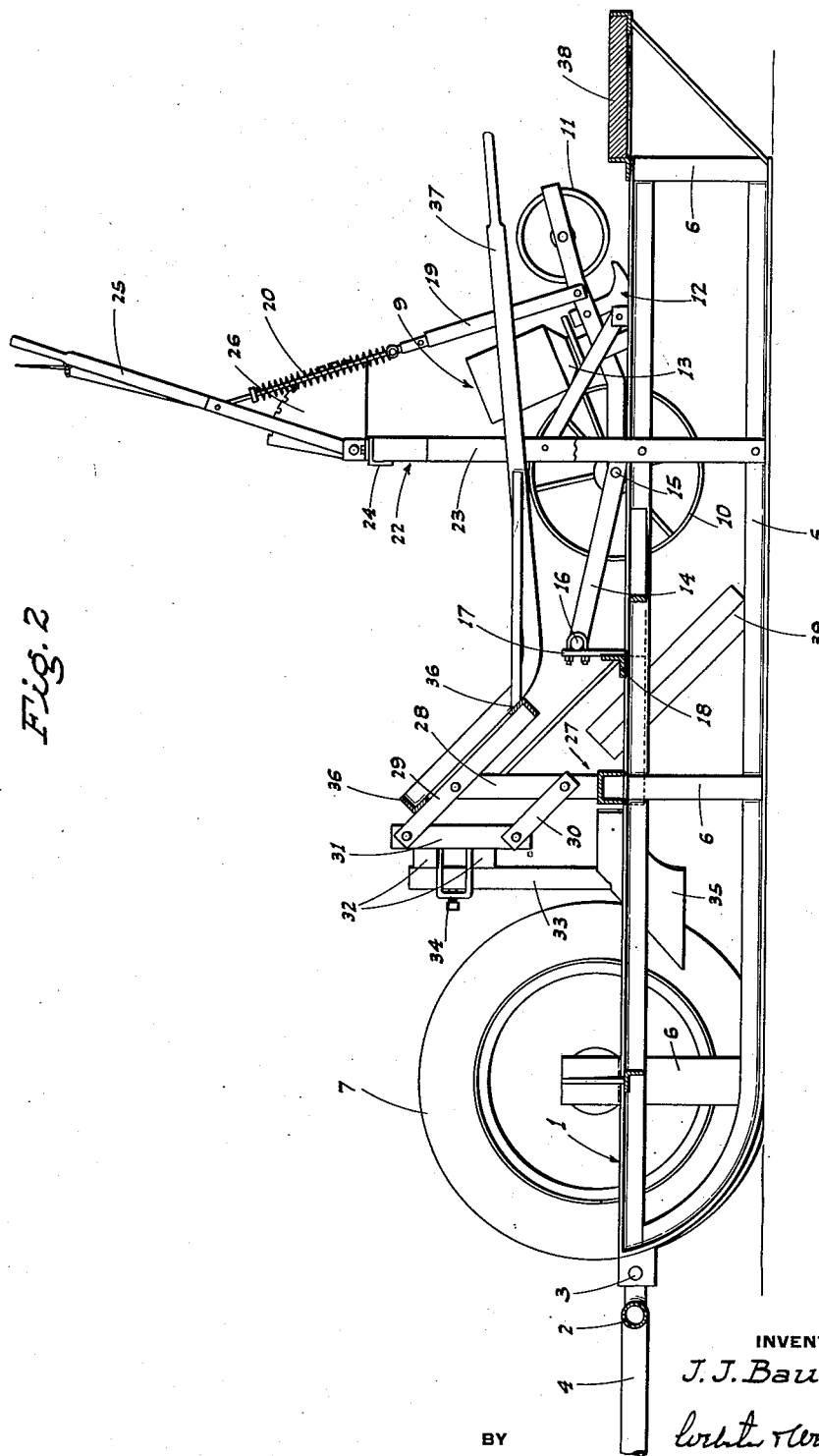
Fig. 2 is a sectional elevation of the implement showing the plow assembly and planting machines in raised position.
Figure 3:
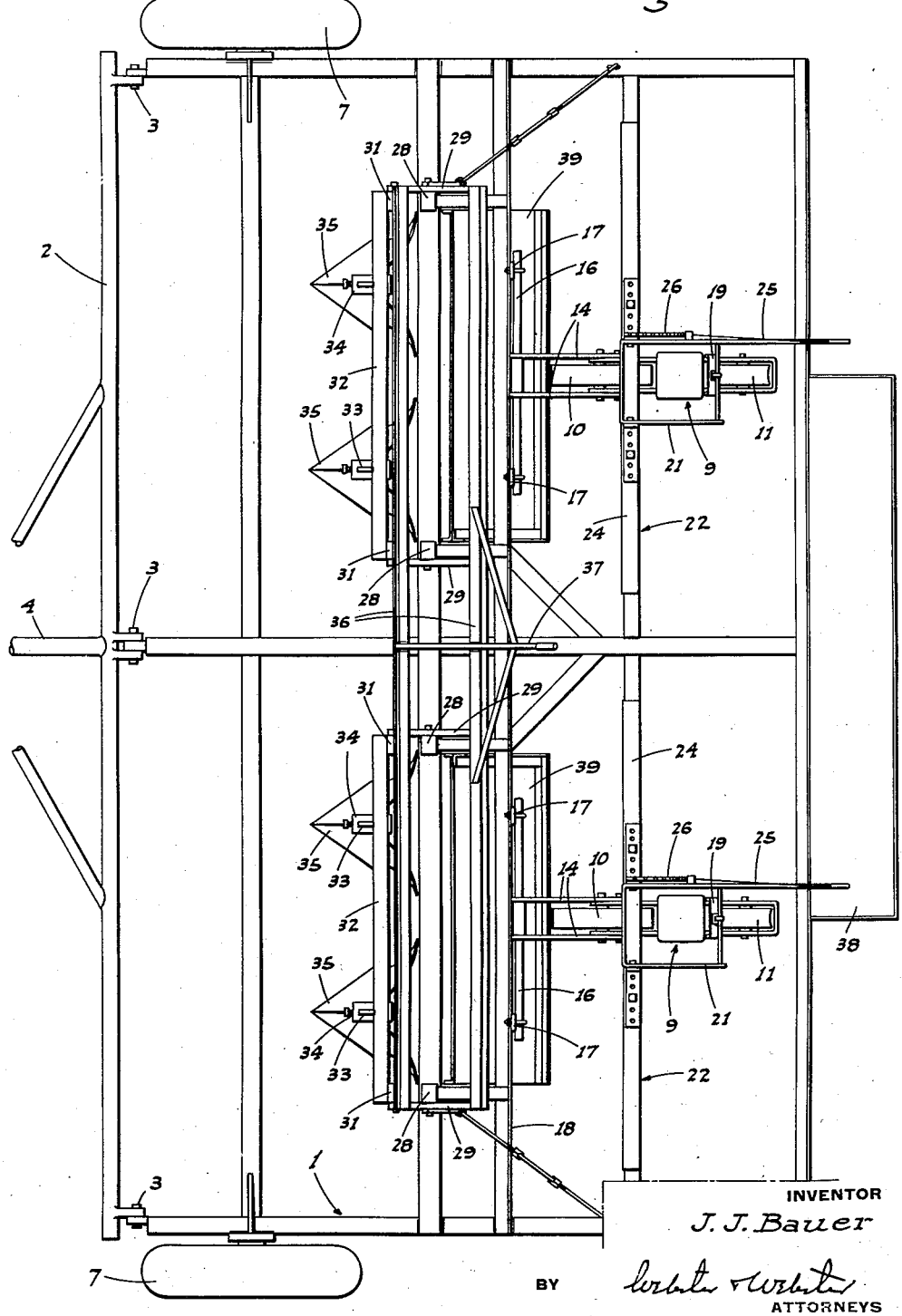
Fig. 3 is a plan view of the implement.

Conversely, when the hand lever 25 is adjusted to a raised position, as in Fig. 2, the compression spring unit 20, which includes a limit rod, is fully extended and lifts the planting machine 9 clear of the ground for turning at the end of a row, or for transport.

When lowered and in operation, each seed planting machine 9 functions to deposit a continuous row or drill of seeds in the ground along a lengthwise row or path, which row is worked immediately ahead of the planting machine in the following manner:

A transverse, upstanding frame structure 27 is mounted on the main frame 1 adjacent its forward end and considerably ahead of the corresponding planting machine 9; such upstanding frame structure 27 including transversely spaced posts 28. Each post 28 is fitted with a vertically movable parallel linkage assembly comprising an upper link 29 and a lower link 30 pivotally mounted to said post. In parallel relation to the post 28 and ahead thereof, each parallel linkage assembly includes a vertically movable post 31. A pair of vertically spaced transverse tool bars 32 are secured to, and extend between, the posts 31 of the parallel linkage assemblies, and a pair of transversely spaced standards 33 are vertically adjustably secured in engagement with the tool bars 32 by clamps 34. At their lower ends the standards 33 each carry a furrow forming plow 35. The standards 33 and plows 35 are disposed to work on opposite sides of the lengthwise path of the corresponding planting machine 9. In other words, when the parallel linkage assemblies are vertically adjusted so as to lower the plows 35, the latter dig furrows on opposite sides of the seed bed over which the corresponding planting machine 9 will subsequently travel.

To provide for simultaneous vertical adjustment of the pair of plows 35 for both planting machines 9, the upper links 29 are rearwardly extended somewhat and are all connected by transverse cross bars 36.

Centrally of the ends of said cross bars, the same are fixed with an elongated rearwardly projecting hand lever 37 for operator control. The hand levers 25 which control raising and lowering of the planting machines 9, and the hand lever 37 which controls raising and lowering of the pairs of plows 35, are accessible for selective manual adjustment by the operator who stands on an operator's platform 38 at the rear of the main frame.

In order to level the seed bed between the furrows formed by the plows 35 and ahead of the corresponding planting machine 9, the following is provided:

Rearwardly of each pair of furrow forming plows 35 the main frame is fixed with a rearwardly and downwardly inclined, transverse, leveler blade 39 whose lower edge is set to run in a predetermined horizontal plane with respect to the runners 5. As the implement advances the plows 35 first form the aforesaid furrows on each side of the seed bed; then the corresponding blade smooths and levels such seed bed at a point between the plows and the corresponding planting machine 9; and finally said machine, in its trailing position, acts to deposit seeds in said seed beds in a lengthwise row centrally between the furrows.

When the implement reaches the end of a row, the operator manipulates the hand levers 25 and hand lever 37 to raise the plows 35 and planting machines 9 to permit the implement to turn without obstruction, and after the turn is completed these parts are again lowered into their working positions.

The described implement provides a practical and reliable mount for seed planting machines, maintaining the machines in proper working position at all times, and additionally preparing the seed beds by pre-forming the furrows and leveling said beds in advance of the seed planting operation.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A seed planting machine comprising a rigid substantially rectangular frame, rigid ground supported runners fixed to the sides of the frame longitudinally of the line of draft of the machine, draft means pivotally connected to the front end of the frame for vertical swinging movement with respect to the frame, a pair of furrow forming plows mounted on the frame and spaced apart transversely of the frame, a seed planter mounted on the frame to the rear of the plows and so positioned as to deposit seed in a row substantially midway between the lines of travel of the plows, and a leveling scraper fixed to the frame at a point between the plows and the planter, said scraper extending transversely of the machine and spanning the space between the lines of travel of the plows, the lower edge of the scraper being held at a constant predetermined level with respect to the ground engaging surfaces of the runners, the plows and the planter being separately vertically adjustable relative to the frame and scraper blade.

JOSEPH J. BAUER.

REFERENCES CITED

The following references are of record in the file of this patent:

UNITED STATES PATENTS

| Number | Name | Date |
|--------|------|------|
| 383,948 | Groff | June 5, 1888 |
| 393,076 | Novotny | Nov. 20, 1888 |
| 829,556 | Warren | Aug. 28, 1906 |
| 1,118,023 | Knoblock | Nov. 24, 1914 |
| 1,371,012 | Williams | Mar. 8, 1921 |
| 1,696,562 | Allen | Dec. 25, 1928 |

FOREIGN PATENTS

| Number | Country | Date |
|--------|---------|------|
| 235,330 | Germany | June 9, 1911 |